US009399291B2

(12) United States Patent
Shi et al.

(10) Patent No.: US 9,399,291 B2
(45) Date of Patent: Jul. 26, 2016

(54) PLANNING A GRASP, FOR USE BY A ROBOTIC GRASPER TO PICK UP A COMPLEX OBJECT, BASED ON OBJECT, GRASPER, AND GRASPER APPROACH DATA

(71) Applicant: GM GLOBAL TECHNOLOGY OPERATIONS LLC, Detroit, MI (US)

(72) Inventors: Jianying Shi, Oakland Township, MI (US); Gurdayal Singh Koonjul, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 104 days.

(21) Appl. No.: 14/099,062

(22) Filed: Dec. 6, 2013

(65) Prior Publication Data

US 2014/0163729 A1 Jun. 12, 2014

Related U.S. Application Data

(60) Provisional application No. 61/734,690, filed on Dec. 7, 2012.

(51) Int. Cl.
*B25J 9/10* (2006.01)
*B25J 9/16* (2006.01)

(52) U.S. Cl.
CPC ..... *B25J 9/1612* (2013.01); *G05B 2219/39466* (2013.01); *G05B 2219/39486* (2013.01); *G05B 2219/39505* (2013.01); *Y10S 901/31* (2013.01)

(58) Field of Classification Search
CPC .......... B25J 9/00; B25J 9/0006; B25J 9/0009; B25J 9/02; B25J 9/023; B25J 9/10; B25J 9/1005; B25J 9/106; B25J 9/16; B25J 9/1605; B25J 9/1612; B25J 9/1628; B25J 9/1656; B25J 9/1661; B25J 9/1664; B25J 9/1671; Y10S 901/02; Y10S 901/31
USPC .......................... 700/245, 250, 251, 252, 262
See application file for complete search history.

(56) References Cited

U.S. PATENT DOCUMENTS

| 4,611,292 | A | * | 9/1986 | Ninomiya | ............... | B25J 19/023 |
| | | | | | | 348/94 |
| 4,980,626 | A | * | 12/1990 | Hess | ...................... | B25J 9/1005 |
| | | | | | | 250/559.33 |

(Continued)

*Primary Examiner* — Stephen Holwerda
(74) *Attorney, Agent, or Firm* — Mickki D. Murray, Esq.; Parks IP Law LLC (57) ABSTRACT

A system, for planning a grasp for implementation by a grasping device having multiple grasping members, including a processor and a computer-readable storage device having stored thereon computer-executable instructions that, when executed by the processor, cause the processor to perform multiple operations. The operations include generating, for each of the multiple grasping members, multiple planar polygon representations of a three-dimensional object model. The operations also include transforming a planar polygon, of the multiple polygons generated, to a frame of a link of multiple links of a subject member of the multiple grasping members, forming a transformed polygon, being a cross-section of the object model taken along a member-curling plane of the subject member. The operations further include sweeping, in iterations associated respectively with each link of the subject member, the link from a fully-open position for the link to a point at which the link contacts the transformed planar polygon.

20 Claims, 4 Drawing Sheets

(56) References Cited

U.S. PATENT DOCUMENTS

5,845,048 A * 12/1998 Masumoto ............ B25J 9/1697
 706/20

2007/0219668 A1 * 9/2007 Takahashi ............ B25J 15/0009
 700/249
2010/0301539 A1 * 12/2010 Murayama ............ B25J 9/1674
 269/74

* cited by examiner

PLANNING A GRASP, FOR USE BY A ROBOTIC GRASPER TO PICK UP A COMPLEX OBJECT, BASED ON OBJECT, GRASPER, AND GRASPER APPROACH DATA

TECHNICAL FIELD

The present disclosure relates generally to planning a grasp for use by a robotic grasper (or hand or gripper) in real-time and, more particularly, to systems, computer-readable storage devices, and methods for planning the grasp for picking up a complex object based on object, grasper, and grasper approach data.

BACKGROUND

Traditional methods for grasping a complex three-dimensional object using a robot hand are tedious and consumptive in terms of time and processing resources. One iterative manual approach consists of (1) manually moving the robot hand to near the object, (2) positioning the fingers around the object for a desired grasp, (3) using a command program to initiate closure of the fingers around the object, (4) checking to see if the object is securely held by manually attempting to shaking the object out of the robot grasp, (5) making a mental judgment of whether other robot finger positions would be better, and, if so, (6) repeating above steps until the operator is satisfied with the grasp.

The difficulties relates in part to the need to independently control each of the large number of degrees of freedom (DOF) associated with the hand.

In addition to being time and energy consuming, it is difficult or impossible to achieve efficiently a best or ideal grasp for a specific task. And the likelihood of doing so decreases in reverse proportion to the degrees of freedom of the robot hand being used, especially at higher degrees such as six, ten, twelve, or more. That is, the difficulty of planning a feasible and robust grasp is much higher in real-time for grasping devices having more separately-actuatable elements.

A five-finger hand, for instance, can have twelve or more degrees of freedom (DOF), or separately-movable elements. A DOF breakdown for an example five-finger robot hand resembling a human hand includes four DOF for the thumb, three DOF for each of the index finger and the middle finger, one DOF for the ring finger, and one DOF for the little finger.

As another example, a human hand has been modeled with twenty (20) DOFs.

Some conventional systems grasp objects based simply on feedback from real-time vision systems and/or touch sensors. Some attempt to grasp objects based only on feedback from a camera and/or one or more touch on-robot sensors, or by human, manual, control or teaching of a robot hand. All are computationally expensive, and time consuming for performing efficiently in real-time applications.

Active research in automatic robotic grasp planning includes grasp contact modeling, grasp quality evaluation, and grasp optimization. Contact modeling includes modeling effects of contact frictions at one or more grasp contact locations. Quality evaluation includes quantifying grasp quality based on a set of grasp quality metrics.

Other difficulties associated with planning an optimal grasp for a robotic hand include the complex kinematic structure associated with the many degrees of freedom, complexities of the geometric shapes of objects to be grasped, and the need to determine the frictional forces required at each grasp contact—i.e., at each hand to object contact points.

Conventional approaches, such as academia, for planning a robotic grasp can be grouped roughly into three groups. The groups include classic motion planning using collision detection, direct-construct grasp contacts based on grasp-closure properties, and grasp planning using explicit kinematic hand constrains.

Example classic motion planning with collision detection use probabilistic roadmaps (RPM), rapidly-exploring random trees (RRT), and collision-detection techniques to generate a high number of candidate grasps, such as thousands of candidate grasps, and then to evaluate the candidate grasps for grasping qualities. Generating thousands of candidate grasps is, alone, time and computation consuming. Selecting a preferred grasp according to this approach, by evaluating each of the generated candidates, takes even more time and processing. Generating the grasps and selecting one can take an hour or more.

Three main bottle necks to reaching a speed solution exist in this approach. The first one is the complexity of object modeling required. A second is the need for explicit collision detection. A third is the high dimension space of robot hands to search a valid robotic grasp.

The second conventional approach mentioned above, regarding constructing grasp contacts based on grasp-closure properties, starts with a grasp quality metric, such as form closure or force closure, then attempts to construct such an optimized grasp using a given number of grasp contacts for specific shaped objects in two or three dimension. This approach is also time and computationally intensive and, like the other conventional approaches, still does not reliably result in a feasible grasp using a robotic gripper, or grasping device.

The third above-mentioned conventional approach plans grasps using explicit kinematic hand constrains, robot hand data. The approach starts with a set of good initial feasible grasp positions and then iteratively refines grasp positions based on a grasp quality measure by exploring adjacent grasp candidates that satisfy the kinematics of the robotic hand.

Disadvantages of this approach include the requirement for a good initial feasible grasp position, because otherwise the search process terminates with a failure or a local minimum position. Another disadvantage is that the process, including the needed convergence on a preferred grasp, which can include fifty to eighty iterations, or more, is slow and computationally intensive.

SUMMARY

Algorithm-based systems and methods for intelligently planning a grasp-device approach to and grasp of a three-dimensional object (e.g., complex three-dimensional object) are needed.

Planning a high-quality robotic grasp for an arbitrary-shaped object is a grasp-synthesis problem. The question is where to put each of the robot fingers around an object to produce a secure grasp. The question is answered primarily by determining robotic finger configurations, or poses, e.g., joint angles for all fingers, that would produce a desired set of grasp contacts.

For faster implementations, algorithms based more on analytics are preferred over more-iterative processes such as basically numerical iterative solutions. Fast implementation allows real-time use in time-sensitive environments, such as on an assembly line.

Related foci of the solution are feasibility and efficiency. The grasp algorithm exploits kinematic characteristics of the particular robot hand being used for physically-implementable grasps.

Another focus, to facilitate and expedite grasp planning, includes kinematic modeling of all fingers of the grasping device. By using a kinematic model of the hand, any motion of one finger can be decomposed to two orthogonal motions: one on a finger-curling plane and one that places and orients the finger-curling plane. The grasp planning for the whole hand can be solved by planning grasps for each finger on its respective curling plane.

In one embodiment, it is preferred that per-finger processing be performed sequentially, or simultaneously. Breaking the multi-finger grasp planning to per-finger computations can be referred to as first-level grasp-planning decomposing. A second-level is described farther below.

This decomposing approach to grasp planning transforms the overall goal of planning a high-dimension grasp (or grasp in high-dimension space), corresponding to the entire grasping device, into multiple smaller planning problems focused on respective low-dimension grasps or space, corresponding to each finger of the grasping device. The high-dimension space can include, for example, twelve (12) or twenty (20) degrees of freedom, as described in the Background section above.

The decomposing of higher-dimensional space to lower-dimensional space also includes, in what can be referred to as a second-level grasp-planning decomposing, determining, in connection with each finger, sequentially, a setting for each joint of the finger sequentially.

The grasp algorithm ensures a computation efficiency by identifying, in connection with each finger, only slices, or slides, of a subject complex object shapes that are on the finger curling plane, and subsequently using these small sections of object data to determine joint configurations for the finger.

Further regarding the grasp planning, the technology promotes efficient and fast grasp planning by actively narrowing a grasp-solution space by removing non-relevant object data, of the object data on the respective finger plane, representing portions of the object that are not within reach of the robot fingers, and so cannot be grasped. This allows the planning system to arrive more quickly and efficiently at a physically implementable grasp plan.

The automatic grasp planning results in position data for each degree of freedom of the dexterous robotic hand for restraining and immobilizing the object for a specific purpose.

In one aspect of the present technology include a system, for planning a grasp for implementation by a grasping device having multiple grasping members, comprising a processor and a computer-readable storage device having stored thereon computer-executable instructions that, when executed by the processor, cause the processor to perform multiple operations. The operations include generating, for each of the multiple grasping members, multiple planar polygon representations of a three-dimensional object model. The operations also include transforming a planar polygon, of the multiple polygons generated, to a frame of a link of multiple links of a subject member of the multiple grasping members, forming a transformed polygon, being a cross-section of the object model taken along a member-curling plane of the subject member. The operations further include sweeping the link from a fully-open position for the link to a point at which the link contacts the transformed planar polygon.

In an embodiment, the operations further comprise performing iterations, including at least the generating, transforming, and sweeping operations, with respect to each the multiple links of the subject member to determine a grasping pose for the links of the member.

In one embodiment, the operations further comprise (a) determining, based on the sweeping operation, an angle $\theta(i)$ for a subject link (i) of the plurality of links, and (b) comparing the angle $\theta(i)$ determined to a pre-set lower-limit angle $\theta_{lower\_limit}(i)$ for the subject link (i) and a preset upper-limit angle $\theta_{upper\_limit}(i)$, including determining whether the determined angle $\theta(i)$ is between the lower limit $\theta_{lower\_limit}(i)$ and the upper limit $\theta_{upper\_limit}(i)$.

In an embodiment, the operations further comprise determining, responsive to determining that the determined angle $\theta(i)$ is not between the lower limit $\theta_{lower\_limit}(i)$ and the upper limit $\theta_{upper\_limit}$ whether $\theta(i)$ is greater than $\theta_{upper\_limit}(i)$.

In one embodiment, the subject member is represented by (k) and the operations further include (a) determining, if the determined angle $\theta(i)$ is greater than the upper limit $\theta_{upper\_limit}(i)$, that the subject member (k) would not, at the subject link (i), establish a valid grasp contact with the object model based on the determined link angle $\theta(i)$, and (b) setting as the link (i) angle, for use in subsequent grasp planning, in one or more next iterations, with respect to upper links $(i+1, \ldots, N_e(k))$, the link (i) lower limit $\theta_{lower\_limit}(i)$.

In an embodiment, the subject member is represented by (k), and the operations further comprise determining, if the angle $\theta(i)$ is not greater than $\theta_{upper\_limit}(i)$, whether the subject link (i) is a first link $N_s(k)$ of the subject member (k).

In one embodiment, the operations further comprise (a) determining, in response to determining that the subject link (i) is not the first link $N_s(k)$ of the member (k), that an angle previously set for a prior link should be changed, (b) adjusting a previously-set angle $\theta(i-1)$ of the immediately-preceding link $(i-1)$, including lowering the previously-set angle $\theta(i-1)$, and (c) repeating, with respect to the subject link (i), after adjusting the previously-set angle $\theta(i-1)$, and using the angle as adjusted for $\theta(i-1)$, at least the generating, transforming, sweeping, and comparing operations.

In an embodiment, the operations further comprise (a) determining, in response to determining that the subject link (i) is a first link of the subject member (k), that the subject member (k) would contact the object model at an angle that would not allow a proper grasp of the object model using the subject link, (b) initiating obtaining of new approach data, and (c) repeating, using the new approach data, at least the generating, transforming, sweeping, and comparing operations.

In one embodiment, the operations further comprise determining, in response to determining that the determined angle $\theta(i)$ is between the lower limit $\theta_{lower\_limit}(i)$ and the upper limit $\theta_{upper\_limit}(i)$, whether contact with the object model occurred on the link.

In an embodiment, the operations further comprise (a) determining, in response to determining that contact with the object model occurred on the subject link, that the contact determined is a valid grasp contact on the subject link, and (b) setting the determined angle $\theta(i)$ as the angle for the link (i), and setting the contact data as a valid contact, for use in one or more subsequent iterations including performing again at least the generating, transforming, sweeping, and comparing operations in connection with at least one higher link.

In one embodiment, the operations further comprise determining, responsive to determining that the determined contact is a valid grasp contact on the subject link, etc., whether the subject link (i) is a last link $N_e(k)$ on the member (k).

In an embodiment, the operations further comprise performing, responsive to determining that the subject link (i) is not the last link $N_e(k)$ on the member (k), again at least the generating, transforming, sweeping, and comparing operations in connection with a next link (i+1), with the pose of the subject link (i) set as a consideration.

In one embodiment, the operations further comprise determining, in response to determining that the subject link (i) is the last link $N_e(k)$ on the subject member (k), whether a valid contact was set for all links coupled to the current link.

In an embodiment, the operations further comprise determining, responsive to determining that a valid contact was set for all links, that processing is complete regarding the subject member (k).

In one embodiment, the operations further comprise initiating, responsive to determining that the processing is complete for the subject member (k), performance of processing with respect to at least one other members of the device.

In an embodiment, the operations further comprise determining, responsive to determining that a valid contact was not set for all links coupled to the subject link, in previous iterations, whether a contact length $l_c$ is greater than half of a link length $l_i$.

In one embodiment, the operations further comprise determining, responsive to determining that the member would not, at the subject link, establish a valid grasp contact with the object model whether the subject link (i) is the last link $N_e(k)$ on the subject member (k).

In an embodiment, the operations further comprise, responsive to determining that the determined angle $\theta(i)$ is between the lower limit $\theta_{lower\_limit}(i)$ and the upper limit $\theta_{upper\_limit}(i)$, (a) determining that a valid feasible grasp contact exists on the subject link, and (b) setting the angle $\theta(i)$ determined as a set angle for the link (i), for use in any subsequent processing, such as in any next iteration in connection with any higher links, with a pose set for the present link (i) as a consideration.

In another aspect, the present technology relates to a method, for planning a grasp for implementation by a grasping device. The method includes generating, by a system using a processor executing computer-executable instructions, in connection with each of the multiple grasping members, multiple planar polygon representations of a three-dimensional object model. The method also includes transforming, by the system, a planar polygon, of the multiple polygons generated, to a frame of a link of multiple links of a subject member of the multiple grasping members, forming a transformed polygon, wherein the transformed polygon is a cross-section of the object model taken along a member-curling plane of the subject member. The method further includes sweeping, by the system, the link from a fully-open position for the link to a point at which the link contacts the transformed planar polygon.

In another aspect, the technology includes the computer-readable storage device and/or any of the above-referenced computer-executable instructions Other aspects of the present invention will be in part apparent and in part pointed out hereinafter.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to employ the present disclosure.

I. Overview of the Disclosure

Generally, the technology described herein facilitates grasping of an arbitrary object using a robotic grasping device, such as a robotic hand. The grasp planning assumes that a planned approach has been or will be made, the approach configured to position at least one portion of the grasping device, e.g., palm of the grasping device, adjacent the object as desired.

Input for planning the grasp includes grasping-device data, such as robot finger shape, link lengths, and initial pose. The input also includes object data, including object shape, dimensions, and/or pose. And the input includes approach data indicating the approach direction, position, and pose of the grasping device.

The grasp planned according to the present technology allows feasible, very fast and robust grasp planning, and so grasping of the object, as compared to conventional systems. The process is simplified and fast in part by decomposing the overall task of determining a feasible and robust grasp in a high-dimensional space—i.e., the grasp for execution by all of the multiple fingers of the grasping device, into multiple smaller tasks, in low-dimensional space—i.e., a target grasp for each of the fingers. The processing for each low-dimensional space—i.e., for each finger, is performed in parallel, or substantially simultaneously.

The low-dimensional planning includes determining at least one position-related setting for each finger of the grasping device. The low-dimensional planning, at the finger level, further includes determining target finger motion on the curling plane of the finger. The algorithm uses the planar object data, described in part above, to determine portions of the object that can be engaged by the finger, and remove from the processing other portions on the plane. Once this is done, as it is for each finger, the remaining computations, evaluating potential finger position vis-à-vis only the remaining portions of the object, are simplified, saving time and further computation toward determining the planned grasp.

The planning is further decomposed by determining, for each finger, sequentially a target joint position for each joint of the finger.

The results of the low-dimensional-space settings are combined into a grasp setting for the entire grasping device, or a planned or calculated grasp pose. The grasping is achieved by controlling the grasping device, while positioned adjacent the object, with a palm of the grasping device facing the object, to move from an initial pose to the grasp pose.

The grasp pose can be defined in terms of settings for each joint of the grasping device. Upon determining a grasp setting for each joint, and given an initial device position adjacent the object, the grasping is achieved by instructing the grasping device to move each joint from an initial joint settings to a corresponding grasp setting determined for the joint.

In a contemplated embodiment, the algorithm also determines a timing of adjusting device joints such that one or more or the joints are moved at a different time and/or at a different rate of speed (e.g., angular speed) than one or more of the other joints. The same contemplated timing settings can apply in connection with the link and degree-of-freedom (DOF) calculations described in the following paragraphs.

The grasping device used to secure and move objects according to the present technology can have any of a wide variety of configurations without departing from the disclosure. The technology could be implemented using a device having, for example, any number of fingers—e.g., two, three, four, or five.

The device and parts thereof can be referred to by any of a variety of names without departing from the present disclosure. The device can be referred to as, for example, a grasping device, a grasper, a grasp device, a gripper, a gripping device, a robot or robotic grasper, gripper, or hand, or the like. The term grasping device is used primarily herein by way of example. Adjustable members or appendages of the device are referred to herein primarily as fingers, but can be referred to in other ways within the present scope.

II. Characteristics of the Grasping Device

Figure 1:
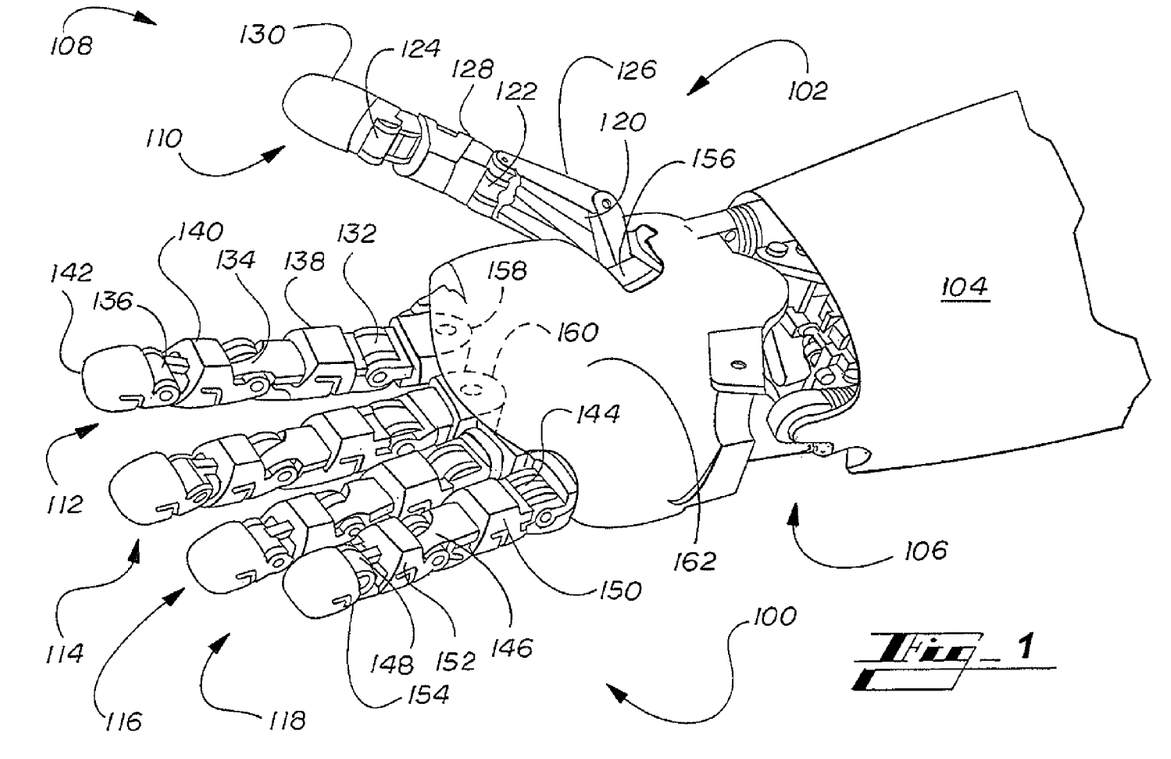
FIG. 1 illustrates an exemplary grasping device, having a plurality of grasping members.

Now turning to the figures, and more particularly to the first figure, FIG. 1 illustrates a schematic block diagram of a grasping device in accordance with an embodiment of the present disclosure. The grasping device is referred to in FIG. 1 by reference numeral 100.

II.A. Grasping Device Components—FIG. 1

With continued reference to FIG. 1, the grasping device 100 includes a grasping, or hand, portion 102. The grasping device 100 includes or is connected to a robotic arm 104. A macro joint or wrist 106 connects the hand 102 and arm 104.

As provided, the hand 102 of the grasping device 100 can include any number of fingers 108. The example device 100 of FIG. 1 includes five (5) fingers, analogous to a human hand. The fingers are referred to herein as a thumb 110, a first or index finger 112, a second or middle finger 114, a third or ring finger 116, and a fourth, last, end, or little finger 118.

Each finger 108 includes at least one joint and at least one link. The links of three of the five fingers of the example device 100 of FIG. 1 are identified by reference numerals. The thumb 110, for example, includes first, second, third, and fourth joints 120, 122, 124, and 156 along its length. The joints separate first, second, and third links 126, 128, 130.

The thumb 100 of the hand, if present, can include other number and location of joints, and so other numbers and sizes of links. The same applies to each appendage or finger 108.

Similarly, the illustrated exemplary first or index finger 112 includes first, second, and third joints 132, 134, and 136 along its length. The joints separate first, second, and third links 138, 140, 142.

Likewise, the illustrated exemplary fourth finger 112 includes first, second, and third joints 144, 146, and 148 along its length. The joints separate first, second, and third links 150, 152, 154.

Each of the fingers 108 can include, in addition to the joints along a grasping plan for the finger 108, can include one or more additional joints allowing the finger to move in one or more other directions. Three example additional joints are indicated in FIG. 1 by reference numerals 156, 120, 158, 160.

The other direction(s) can be, for instance, a lateral, or yaw, motion, whereby the finger moves about the additional joint toward or away from an adjacent finger. By way of example, if the additional joints 158, 120, 160 of the first and second fingers 108, 110 were lateral or yaw joints, the fingers 108, 110 could move about their respective additional joints 158, 160 to cause the hand to make a scissoring motion.

II.B. Degrees of Freedom—FIG. 1, Cont.

As introduced above, the grasping device 100 has a plurality of degrees of freedom. Each degree of freedom corresponds to one or more separately-controllable, separately-actuatable, aspects of the device 100, and each finger 108 is associated with at least one degree of freedom controlling motion of the finger 108. In one embodiment, a separate actuator, motor, or actuating element is associated with each DOF.

As an example DOF distribution, the five-fingered device 100 can have twelve (12) degrees of freedom. If each of the joints of the fingers shown in FIG. 1 was separately controllable, the hand would have eighteen (18) degrees of freedom—i.e., four (4) DOF for each of the separately-controllable joints of the thumb 110, the first finger 112, and the second finger 114, and three (3) separately-controllable joints for each of the third and fourth fingers 116, 118.

For the 12-DOF five-finger example, the DOF include four (4) DOF for the thumb 110, corresponding to each of the separately-controllable joints 120, 122, 124, 156 of the thumb 110. The 12 DOF also include one (1) DOF corresponding to the separately-controllable additional first-finger joint 160, one (1) DOF corresponding to the first, separately-controllable joint 132, and another DOF corresponding to a medial joint 134 and a distal joint 136, which are controllable together, not separately.

The 12 DOF of the example also include one (1) DOF corresponding to each of the separately-controllable second-finger additional joint 162, the separately-controllable first joint, and another DOF corresponding to the medial and distal joints, which are controllable together (the second-finger joints beyond the additional joint 162 are not identified by reference numerals in FIG. 1 to simplify the illustration).

The 12 DOF further include one (1) DOF corresponding to the three joints of the third finger 114, which are controllable together (the third-finger joints are not identified by reference numerals), and one (1) DOF corresponding to the three joints 144, 146, 148 of the fourth finger 116, which are controllable together.

II.C. Grasping Details—FIG. 2

Figures 2, 3:
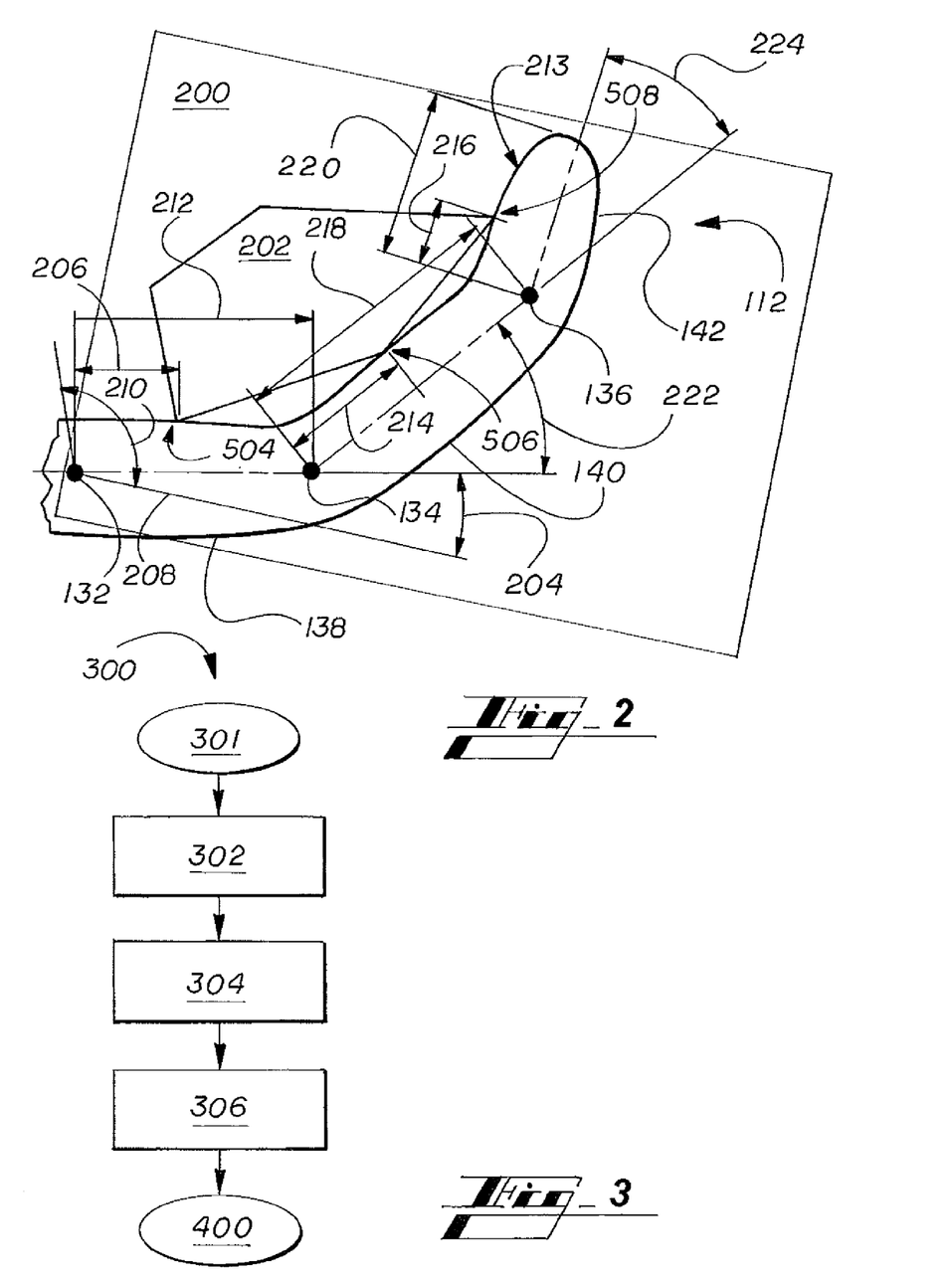
FIG. 2 is a cross-sectional view showing a grasping-device member of the grasping device in a resulting, grasping position, contacting a three-dimensional object (e.g., complex three-dimensional object), and related metrics, including joint angles, link lengths, contact lengths, and a planar polygon formed by intersection of a movement plane, or finger-curling plane, of the grasping-device member and the object.
FIG. 3 illustrates a first example method, for obtaining input data for use in planning a grasp for implementation by the grasping device.

With continued reference to the figures, FIG. 2 illustrates an example grasping member 112 of the grasping device holding a complex or arbitrary-shaped object 202, and related metrics, including joint angles, link lengths, and contact lengths, according to an embodiment of the present disclosure.

The member illustrated can be considered any of the fingers of the grasping device. For description purposes, reference numerals corresponding to the first finger 112 are presented. The joints called out in FIG. 2 are the first, second, and third joints 132, 134, 136 causing the links 138, 140, 142, of the finger 112 to move on the finger-curling plane 200 for the finger 112.

The object is indicated in FIG. 2 by reference numeral 200. It will be appreciated that the view of FIG. 2 actually shows a cross-section or slice of the object, taken along a finger-curling plane of the finger 112.

The object can be a simple object, such as a sphere or cylinder, or a more-complex object.

Characteristics, movements, and control of the parts of the fingers of the grasping device 100 are described further below in connection with the methods of the present technology.

III. Methods of Operation—FIGS. 3 and 4

Figure 4:
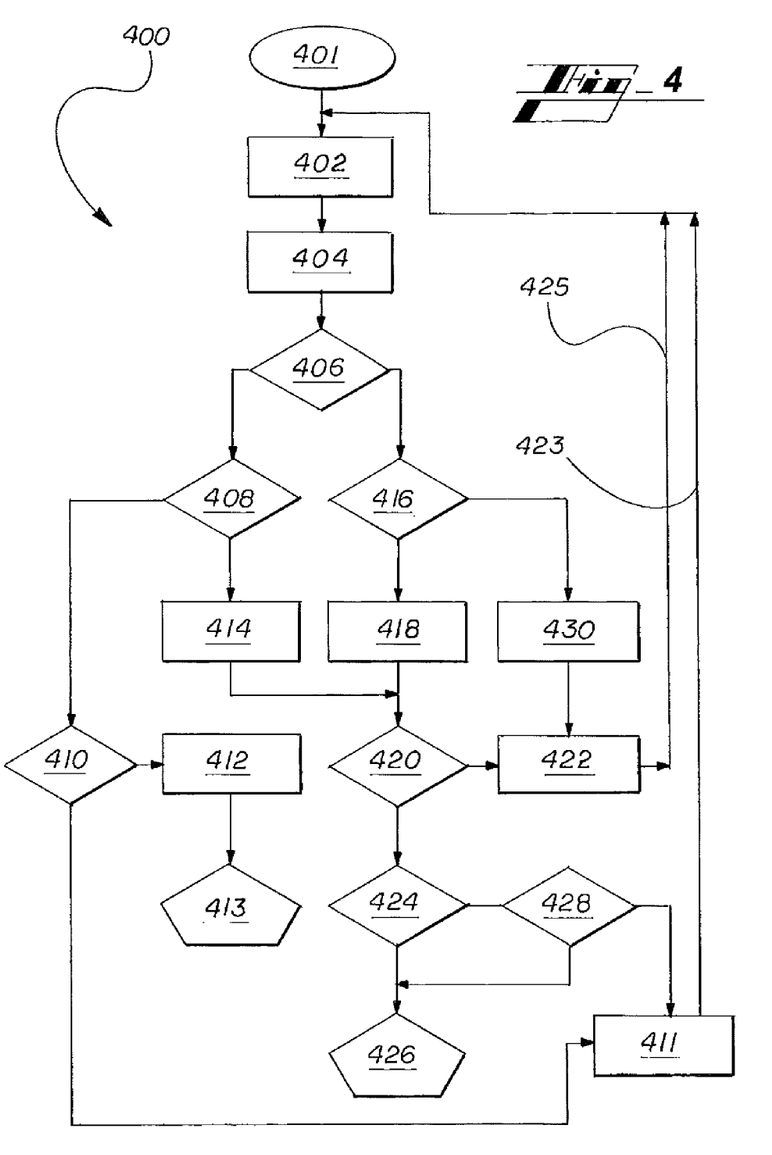
FIG. 4 illustrates a second example method, for planning a grasp for implementation by the grasping device, using said input data.

Operations of the methods described herein, including the methods 300, 400 illustrated in FIGS. 3 and 4, are not necessarily presented in any particular order and that performance of some or all the steps in an alternative order is possible and is contemplated.

The operations have been presented in the demonstrated order for ease of description and illustration. Operations can be added, omitted and/or performed simultaneously without departing from the scope of the appended claims. It should also be understood that the methods, including the illustrated methods 300, 400 can be ended at any time.

In certain embodiments, some or all operations of this process, and/or substantially equivalent steps are performed by execution of computer-readable instructions stored or included on a computer readable medium, such as that describe herein below in connection with the exemplary computer system of FIG. 5.

III.A. Method of Obtaining Input Data—FIG. 3

FIG. 3 shows an exemplary method 300 for obtaining input data for use in planning a grasp for implementation by the grasping device 100, according to an embodiment of the present disclosure.

The method 300 commences 301 and flow of the algorithm proceeds to block 302 whereat the computer processor obtains data regarding the grasping device 100. The present algorithm for planning a grasp considers the grasping device data, along with object data, to determine how the grasping device characteristics match up with object dimensions and pose, for determining how to position the grasping device for grasping the object.

Obtaining the device data can include generating and/or retrieving the device data. Grasping-device data can be retrieved, for example, from a computer-readable storage medium, memory, or database associated with the computer processor performing the algorithm or query an physical grasper, for which the data is not known to the system, for its structure in real-time use. Such storage devices are described further below in connection with the exemplary computer system illustrated in FIG. 5. It is contemplated that the computer system or at least some of the storage medium mentioned resides at the grasping device or robotic components adjacent the grasping device.

As provided, the present robotic system can include any of a wide variety of grasping devices. Options include robotic hands having one, two, three, four, five, or more fingers. Each hand has characteristics particular to it including the number of, and finger portions controlled by the degrees of freedom (DOF), size of the fingers, size of links between locations, location of joints, axes of rotation, and rotation ranges for joints—e.g., maximum and minimum angles achievable per joint.

These and many other grasping-device characteristics can be represented directly, or indirectly or inferentially, by the grasping-device data.

In a contemplated embodiment, the system to which the grasping device 100 is connected for operation can be readily connected to any of numerous types of grasping devices. In the embodiment, the system determines a type of the grasping device, or at least characteristics thereof from representative data, such as a specifications message (e.g., a push-type message or message responding to an inquiry), received from the grasping device.

The specifications message can be sent, for example, automatically in response to the hand being first installed locally for use. The message data can include the grasping-device data and/or indicate a grasping-device type that the computer processor uses to obtain the grasping-device data, such as from a local or remote database.

With continued reference to FIG. 3, at block 304, the computer processor obtains data regarding the object 200. Obtaining the object data can include generating and/or retrieving the object data. As referenced above, the present algorithm for planning a grasp considers the object data, and grasping-device data, in determining how the grasping device matches up with the object and how the grasping device should be positioned for the planned grasp.

The object data can include data indicating the dimensions and pose of the object. In one embodiment, the object data indicates, directly or indirectly, the dimensions and pose of the object in six-dimensional space. The object data can include computer-aided design data, describing the object. The object data can indicate dimensions of the object surface in terms of three linear dimensions (e.g., X, Y, Z) and indicate pose of the object in terms of three angular or rotational dimensions.

In a contemplated embodiment, the object data is obtained at least in part using one or more local sensors such as a camera.

At block 306, the computer processor obtains data indicating a pre-determined approach of the grasping device 100 toward the object 200. Obtaining the approach data can include generating and/or retrieving the approach data. In one contemplated embodiment, the approach data is part of the object data described above in connection with operation 304.

The approach data indicates an initial position of the grasping device 100 adjacent the object. The position is referred to as an initial position, though it is a position resulting from a planned approach to the object, because it is a starting point from which a grasp motion is to be performed. The present algorithm for planning a grasp considers the initial position as a starting point from which the grasping device will perform the planned grasping motion.

The position information indicates, directly or indirectly, the initial position of the grasping device in six-dimensional space. The approach data can indicate the initial position of the grasping device in terms of three linear dimensions (e.g., X, Y, Z) and indicate pose of the grasping device in terms of three angular or rotational dimensions.

In one embodiment, the approach data indicates a position of a palm portion of the grasping device 100. The palm portion is analogous to the human palm, being located adjacent and connected to a base of the finger(s). The palm of the grasping device 100 illustrated in FIG. 1 is represented by numeral 162.

The data obtained, and its use in planning a grasp, is described in further detail below in connection with the algorithm for determining finger and hand poses and FIGS. 4 and 5.

III.B. Method of Determining Finger Pose—FIG. 4

FIG. 4 shows an exemplary method 400 for planning a grasp for implementation by the grasping device, using input data described above, according to an embodiment of the present disclosure.

The method is performed by a computer processor executing instructions or code defining one more algorithms for performing the operations thereof. The algorithm(s) facilitates fast computation of feasible and robust grasps of complex three-dimensional objects.

While an example embodiment of the method is described in more detail below in connection with the numerous operations labeled in FIG. 4, one embodiment of the method can be summarized in three steps.

The steps include (1) determining, for each finger of the grasping device (or first-level task decomposing), and using at least the grasping-device data, finger-curling plane, along which the finger can curl and how the curling plane intersects with the object to be grasped, (2) determining, using at least the grasping-device and object data, planar polygons on the finger-curling plane, the polygon including the portion of the object falling on the finger-curling plane, portions of the object not falling on the plane being removed from consideration, and (3) determining, using at least the planar polygon data and grasping-device data, grasp contacts for each finger using the planar polygon data, further including determining a target grasp angle for each joint (or second-level task decomposing) of each finger of the grasping device.

The method can be performed with respect to each finger of the grasping device—e.g., in parallel or simultaneously for two or more of the other fingers. This decomposing approach to grasp planning simplifies the overall goal of planning a high-dimension grasp (or grasp in high-dimension space) into multiple smaller planning problems focused on respective low-dimension grasps or space. The overall, high-dimension, space can include, for example, twelve (12) degrees of freedom of the hand, and each low dimension space relating to the degrees of freedom applicable to the respective fingers—e.g., one, two, or three degrees of freedom per finger.

In one embodiment, it is preferred that computer processor execute the algorithm generally simultaneously in connection with every finger of the grasping device. The algorithm illustrated in FIG. 4 represents the process performed in connection with a single finger, starting with a first link; thus, the process 400 of FIG. 4 will often be performed multiple times in parallel, in connection with each of the multiple fingers.

For description purposes, a subject finger being evaluated in planning the grasp by the algorithm of FIG. 4 is represented as the $k^{th}$ finger, where k is a positive non-zero integer. If the grasping device has m number of fingers total, then $1 \leq k \leq m$—i.e., any finger being evaluated in planning the grasp can be considered as either a first finger (1), a final finger (m), or, if the finger has more than two fingers, an intermediary finger.

A total number of serial planar links for a finger can be referred to as $N_{DOF}(k)$. These links are referred to as plane or planar links because they fall on a finger-curling plane that the finger can form by rotating its links about its joints. Considering the convention described in the immediately preceding paragraph, a first or start planar link for any finger (k) can be represented as $N_s(k)$, where s indicates that the link is a starting link, and the first planar link has the following relationship: $1 \leq N_s(k) \leq N_{DOF}(k)$. That is, the first planar link could be any link between the first link and the last link.

A final or end planar link for any finger (k) can be represented as $N_e(k)$, where e indicates that the link is an ending link, and the following relationship exists: $1 \leq N_s(k) < N_e(k) \leq N_{Dof}(k)$. That is, the final planar link could be any link between the first link and the last link. It can be considered that $N_e(k) = N_{DOF}(k)$, i.e. the last distal link. In a contemplated scenario, $N_e(k)$ is not equal to $N_{DOF}(k)$.

The link for the finger (k) being considered in each performance of the method 400 can be referenced by variable i. The method 400 starts with processing with respect to the first planar link—i.e., $i = N_e(k)$, of finger (k). The finger shown in FIG. 2 can be considered as the subject finger (k) for purposes of describing the processes 400 for illustration purposes.

A goal of each performance of the method 400 is to determine a setting for each joint of the finger. The setting can be, for instance, an angle by which the joint should be set. In one embodiment, the setting decision is represented by target or grasp locations for the links, and so the resulting angles are ordered indirectly. In another contemplated embodiment, the setting decision indicates a level to which the one or more degrees of freedom (DOF) for the finger should be set, and so thereby also affecting the resulting joint angles.

With reference to FIG. 4, the method 400 commences 401, and flow of the algorithm proceeds to block 402 whereat the computer processor transforms the planar polygon to a frame or context of the subject link, being the $i^{th}$ link. The frame can be referred to as the $i^{th}$-link local frame or context.

The term polygon is used generally herein to refer to a shape. The shape may include straight and/or curved lines.

As provided above, the planar polygon is the polygon formed by intersection of the plane formed by the finger—e.g., the finger-curling plane 200 in FIG. 2. Transforming the planar polygon to the $i^{th}$-link local frame includes clipping the polygon.

It will be appreciated that clipping the polygon does not result in disregarding portions of the polygon within range of the entire finger (k) because the process iterates forward, so that subsequent truncated polygons, generated in connection with the upper links (i+1, etc.), will be evaluated in connection with performance of the process 400 in connection with the upper links.

To clip or truncate the planar polygon, the computer processor removes from present consideration object data (e.g., CAD data) that fell on the plan of the finger but does not fall in a finger-curling plane of the $i^{th}$ link and any lower links of the finger (e.g., i–1 link, i–2 link, etc.). In other words, clipping the planar polygon includes removing all portions of the planar polygon that are intersected by links above the present link—the upper links can be referenced as i+1, . . . , $N_e(k)$. In the illustrated example, with the subject link i as the first link 138, then the upper links are links 140, 142.

Figure 5:
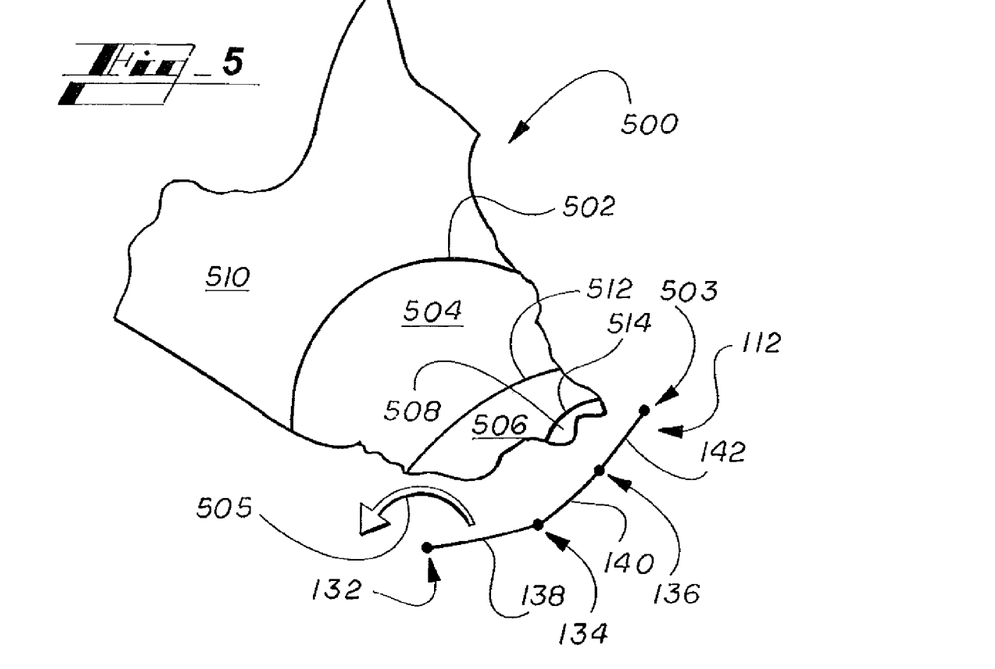
FIG. 5 illustrates the grasping-device member and the object of FIG. 2 in a pre-sweeping pose, indicating a truncated portion and a clipped-off portion of the planar polygon.

For purposes of illustrating the finger-sweep function, FIG. 5 shows schematically a grasping-device member and a slice, or cross-section of the object 500, taken along the finger plane of the finger (k).

The member can be any finger (k) of the robotic hand, such as finger 112 of FIG. 2. As in FIG. 2, the finger 112 includes first, second, and third joints 132, 134, and 136 corresponding to first, second, and third links 138, 140, and 142.

The object 501 of FIG. 5 is different than the object shown in FIG. 2, being notably larger to better illustrate the sweeping function.

It should be appreciated that the markings within the object, e.g., radii 502, 512, and 514, correspond to various iterations of sweeping (namely, a first second, and third iteration, corresponding to the first, second, and third link/joint pairs), as described next, and are shown in a single view to simplify the present illustration and description.

As provided, each iteration of sweeping is performed in connection with a subject link (i). Thus, if a finger (k) has three links, (i)=1, 2, and 3 or ((i)=$N_s$(k), 2, $N_e$(k), then the sweep is performed three distinct times, as in the example of FIG. 5. In other words, i=$N_s$(k) is a first sweep, i=$N_s$(k)+1 (e.g., i=2) is the second, and so on to i=$N_e$(k) (e.g., i=3 for a three-link finger) being the last sweep.

With respect to the first illustrated link 138, a first iteration of sweeping includes sweeping the entire finger (k) (112 in the example) rotating about joint 132, or at least includes sweeping the entire finger that is above joint 132.

For the sweep for each link (i), the angles of upper links (i+1, ... $N_e$(k)) are set to their low-limit, or fully back or open position. For example, for the first sweep, the finger would actually be straight, instead of bent at joint 134 as shown, if such a straight configuration corresponded to each upper link being set to its low limit. Any lower links (i−1, etc.) are set at pre-determined values, such as values set in an earlier iteration of sweeping.

The sweep of the entire finger, or at least the entire finger above the joint 132, overlaps a first portion of the finger-curling plane object slice 500. The first portion includes all parts of the finger-curling plane object slice 500 falling within an arc 502 formed by an end 503 of the finger 112.

The arc 512 encompasses labeled areas 504, 506, and 508 of the finger-curling plane object slice 500 in FIG. 5. The encompassed areas can be referred to as a first truncated planar polygon.

The portion of the finger-curling plane object slice 500 outside of the first truncated planar polygon can be referred to as a first clipped-off portion. The first clipped-off portion is referenced by numeral 510 in FIG. 5.

With respect to the second illustrated link 140, a second iteration of sweeping includes sweeping, about the second joint 134, parts of the finger (k) (112 in the example) above the second joint 134.

For the second sweep, e.g., when i=$N_s$(k)+1, as provided above regarding each sweep, angles of upper links (i+1, ... $N_e$(k)) are set to their low-limit, or fully back or open position. And any lower links (i−1, etc.) are set at pre-determined values, such as values set in an earlier iteration of sweeping. For example, if a 10-degree angle (e.g., 10 degrees above a minimum angle (e.g., $\theta_{lower\_limit}$(i)) for the first joint/link 132/138) was determined in a first sweeping, described above, then the first link would be posed at the 10-degree angle for implementing the present, second, sweep.

Thus, as illustrated, the second sweep includes sweeping the second and third links 140 and 142 together about the second joint 134, with the first link assumed fixed in place at the angle (10 degrees in the example above) determined for it in the earlier iteration of sweeping.

As shown, the second sweep overlaps a second portion of the finger-curling plane object slice 500. The second portion includes all parts of the finger-curling plane object slice 500 falling within an arc 512 formed by the end 503 of the finger 112 as the medial and distal links 140, 142 rotate about the second joint 134.

The arc 512 encompasses labeled areas 506, and 508 of the finger-curling plane object slice 500. The encompassed areas can be referred to as a second truncated planar polygon.

The second truncated planar polygon is notably smaller than the first truncated planar polygon. The same tendency is generally true in comparing the truncated planer polygon of any lower sweep to the truncated planer polygon of any higher sweep. It will be appreciated that, for this reason, processing of each finger pose is expedited, and gets faster as the sweeping iterations move up the finger, because a smaller planer polygon is being rendered and evaluated at each higher link (i).

The portion of the finger-curling plane object slice 500 outside of the second truncated planar polygon can be referred to as a second clipped-off portion. The second clipped-off portion is referenced by numerals 510 and 504 in FIG. 5.

With respect to the third illustrated link 142, a third iteration of sweeping includes sweeping, about the third joint 136, parts of the finger (k), or 112 above the third joint 136.

For the third sweep, e.g., when i=$N_s$(k)+2, as provided above regarding each sweep, any lower links (i−1, etc.) are set at pre-determined values, such as values set in an earlier iteration of sweeping.

Thus, as illustrated, the third sweep includes sweeping only the third illustrated link 142 about the third joint 134, with the first and link assumed fixed in place at the respective angles determined for them in earlier iterations of sweeping.

As shown, the third sweep overlaps a third portion of the finger-curling plane object slice 500. The third portion includes all parts of the finger-curling plane object slice 500 falling within an arc 514 formed by the end 503 of the finger 112 as the distal link 142 rotates about the third joint 136.

The arc 514 encompasses labeled area 508 of the finger-curling plane object slice 500. The encompassed areas can be referred to as a third truncated planar polygon.

The third truncated planar polygon is notably smaller than each of the lower truncated planar polygons, as described above.

The portion of the finger-curling plane object slice 500 outside of the third truncated planar polygon can be referred to as a third clipped-off portion. The third clipped-off portion is referenced by numerals 510, 504, and 506 in FIG. 5.

Continuing with the flow of the algorithm 400 of FIG. 4, at block 404, the computer processor sweeps the link (i) from a fully-open position for the link (i) to a point at which the link contacts the object, to the extent that the link or an upper link can contact the object. A direction of sweep is indicated generally in FIG. 5 by an arrow on the arc 505. The upper links can be referenced as i+1, . . . , Ne(k).

In some cases, for this sweep, each upper link (i+1, . . . $N_e$(k)) is set to its low-limit position, or fully back or open position. In one embodiment, this is true unless a coupling condition for a higher link (i+1, etc.) has been defined. In such a case, the above-i links (e.g., i+1, etc.) will sweep with the current link i. It will be appreciated that if link 136 and link 134 are covered by a single degree of freedom (DOF), i.e., are actuated by a single motor, link 136 would faster relative to link 134 due to the mechanical coupling relationship. Thus, when the link 134 is swept, link 136 changes angle too, which should also be considered in performing the sweep.

Any $i^{th}$ planar link can be independently driven or coupled with another link(s). If planar link a, e.g., is coupled to planar link b, the coupling relationship is described by $\theta_a$=f($\theta_b$), where $\theta_b$ is a dependent joint and $\theta_a$ is an active joint. When i=a, the active joint is swept in the algorithm, and the dependent joint b is computed simultaneously.

As provided, FIG. 2 shows the finger 112 at a resulting grasp position. Related FIG. 5 shows the finger 112 at the pre-sweep position for the first link 134, wherein each link is at its open, or low-limit, position.

If each joint of the hand rotates from a low limit of 0 degrees, for example, to a maximum degree, as defined by the grasping-device input data, each joint above the subject link (i) is set to 0 degrees for purposes of the sweeping operation of block 404. Thus, if the subject link is the first finger link 138, then the joints 134, 136 above link 138 link are set to zero, or whatever their low limits are according to the grasping-device input data.

Then, for the sweep, finger positions are considered, with respect to the subject link (i, or 134 in the illustrated example), by considering finger positions as the subject link sweeps from the lower limit of the link (i, or 134 in the illustrated example), while the upper links (e.g., links 140, 142) are kept at their low-limit (e.g., fully-open, or fully-back) positions during the sweep, until the subject link (i), or any upper link (i+1, . . . , $N_e(k)$)) contacts the truncated planar polygon.

The sweeping process is indicated schematically in FIG. 5 by the arrow 505.

Once the contact 504 is identified in the sweep, the corresponding pose of the subject link (i) is analyzed further for feasibility—i.e., whether the corresponding pose fits within a grasp plan for the subject finger (k).

The corresponding pose of the subject link (i) is quantified by a corresponding angle value for the joint 132 at the bottom of the link (i, or 134 in the example), or theta(i), or θ(i). The angle θ(i) indicated in FIG. 2 by reference numeral 204. The angle is not called on in FIG. 5, because FIG. 5 shows the pre-sweep pose of the finger. The angle determined 204/θ(i) prior to the validation can be referred to as a proposed angle for the link (i), a potential angle for the link (i), or similar.

The contact is quantified, and can be stored in the system, as having occurred in the sweep and at a contact length $l_c$, which is labeled in FIGS. 2 and 5 by reference numeral 206.

As can be seen in FIG. 2, the contact length 206 is the length extending to the point of contact 504 from a starting point of the $i^{th}$ (e.g., link 138) link. The starting point of the $i^{th}$ link can be considered generally as the joint at the bottom of the $i^{th}$ link—i.e., joint 132 in the present example referring to FIG. 5.

In following operations (process block 406 et seq.), the computer processor evaluates the determined angle θ(i) and contact length $l_c$ to determine whether they fit a proper or desired grasping arrangement. This can be referred to as determining a feasibility of the determined values, or determining whether the values are feasible. If the values are feasible, the computer processor sets the angle θ(i), as the position for the subject link (i), for use in next iterations of the process 400, for higher links (l+1, . . . , $N_e(k)$).

With continued reference to FIG. 4, from block 404, flow of the algorithm proceeds to block 406, whereat, as referenced above, the computer processor commences evaluating the feasibility of the values determined at operation 404.

This first feasibility operation 406 includes comparing the determined, or proposed, angle θ(i)/204 to a pre-set lower-limit angle 208, or $\theta_{lower\_limit}(i)$, and a preset upper-limit angle 210 $\theta_{upper\_limit}(i)$. The lower-limit 208 and upper limit 210 are indicated schematically in FIG. 2. These limits, like the determined angle θ(i) 204, are also not shown in FIG. 5 because FIG. 5 shows the pre-sweep finger pose.

The lower-limit 208 is indicated by a single line, instead of an angular range because, for simplification in the example of FIG. 2, it is assumed that the lower-limit 208 is also the angular reference frame for the link (i). For example, the lower limit 208 can be considered to be 0 degrees, and the other angles 204, 210 are measured therefrom. If, hypothetically, the angular reference frame were different, such as ten degrees less for example, the lower-limit $\theta_{lower\_limit}(i)$ would be 10 degrees (this example is not shown, but it will be appreciated that for the example a reference line could be shown degrees below the shown line 208 and then the lower-limit 208/$\theta_{lower\_limit}(i)$ would then extend from the reference line to the present line 208 shown).

The upper and lower limit data for the subject link (i) is obtained from the grasping-device data described in part above in connection with FIG. 3.

Further regarding the comparison of the determined angle 204/θ(i) to the lower limit 208/$\theta_{lower\_limit}(i)$ and the upper limit 2101 $\theta_{upper\_limit}(i)$, the comparison more particularly includes determining whether the determined angle 204/θ(i) is between the lower limit 208/$\theta_{lower\_limit}(i)$ and the upper limit 210 $\theta_{upper\_limit}(i)$.

In equation form, the consideration is whether $\theta_{lower\_limit}(i)$ (208)≤θ(i) (204)≤$\theta_{upper\_limit}(i)$ (210).

In response to a negative determination at block 406—i.e., 204/θ(i) is not between or equal to $\theta_{lower\_limit}(i)$ and $\theta_{upper\_limit}(i)$, flow of the algorithm proceeds to block 408. At block 408, the computer processor determines whether θ(i) is greater than $\theta_{upper\_limit}(i)$.

In response to a negative result at block 408—i.e., angle 204/θ(i) is not greater than $\theta_{upper\_limit}(i)$, flow of the algorithm proceeds to block 410, whereat the computer processor determines whether the present link (i) is the first link.

If it is, the computer processor concludes that the determined angle 204, or θ(i), would be θ($N_s(k)$) and, because θ(i) is not greater than $\theta_{upper\_limit}(i)$, that the angle 204/θ($N_s(k)$) would be less than $\theta_{lower\_limit}(N_s(k))$ and that i=$N_s(k)$.

Responsive to a negative determination at block 410—i.e., link (i)≠$N_s(k)$, flow of the algorithm proceeds to block 411. At block 411, the computer processor determines that an angle previously set for a prior link—i.e., i−1, i−2, $N_s(k)$) should be changed. Changing a previously-determined angle of a lower link may put the finger (k) in a pose that avoids an improper contact—e.g., a poking or other undesirable finger-to-object collision condition, as is the case when flow proceeds to local-termination pentagon 413, described further below.

In one embodiment of the present technology, the operation of block 411 includes adjusting a previously-set angle θ(i−1) of the immediately-preceding link (i−1), and the changing includes pushing the angle θ(i−1) back, or down (i.e., lowering it). In some embodiments, the algorithm is configured so that the operation is not limited to pushing back the angle θ(i−1) of the immediately-preceding link (i−1). The operation 411 can, for instance, include adjusting any previous joint angle on the finger (k), and the adjusting can include increasing or decreasing. In one embodiment, the adjusting can be performed on more than one of the preceding angles (e.g., both θ(i−1) and θ(i−2)), wherein each adjustment can include an increase or a decrease.

Upon adjusting the angle(s) of the preceding link(s) of the finger (k) at operation 411, the process 400 is repeated, as indicated by return path 423, using the new, as-adjusted, angle(s) for the preceding link(s). In one embodiment, the repeat performance includes repeating the process 400 with respect to the present link (i). In a contemplated embodiment, the process 400 is repeated for any of the previously links (e.g., i−1, . . . , $N_s(k)$).

In response to a positive determination at block 410—i.e., link (i)=$N_s(k)$, and so that θ(i)=($N_s(k)$)<$\theta_{lower\_limit}(i)$=$\theta_{lower\_limit}(N_s(k))$, flow of the algorithm proceeds to block 412.

At block 412, the computer processor concludes that the finger would contact or hit the object 200 at an angle that would not allow a proper grasp of the object using the $i^{th}/N_s$ (k)$^{th}$ link. The relative position leading to this conclusion can include, for example, a tip or other part of the finger being predicted to collide undesirably with, e.g., poke, the object 200. Another example relative position leading to this conclusion is a back or side of the finger contacting the object.

Following the determination of block 412, flow proceeds to block 413. At block 413, the computer processor initiates obtaining of new approach data—reference operation 306 of FIG. 3. A new planned approach is needed because the present approach plan, obtained at operation 306, resulted in the present undesired result of block 412 described above. This condition and information can be used at operation 306 to decide a new approach data.

Returning to the decision diamond 408 of the algorithm 400, in response to a positive result—i.e., the determined angle 204/$\theta(i)$ is greater than the link (i) upper limit 210/$\theta_{upper\_limit}(i)$, flow of the algorithm proceeds to block 414. At block 414, the computer processor determines that the finger would not, at the present link (i), establish a preferred or valid grasp contact with the object based on the determined link (i) angle 204/$\theta(i)$.

The computer processor also at operation 414 sets as the link (i) angle, for use in subsequent grasp planning, in next iterations of the algorithm 400 with respect to upper links (i+1, . . . , $N_e(k)$), the link (i) lower limit 208 $\theta_{lower\_limit}(i)$. In other words, the processor sets $\theta(i)=\theta_{upper\_limit}(i)$, for use in the further processing.

Because the computer processor at block 414 determines that the finger would not, at the present link (i), establish a preferred or valid contact, the processor does not at block 414 store the determined contact information, including the contact length 206, in association with the present link (i).

Returning to the first feasibility-analysis consideration, at diamond 406, in response to a positive determination there—i.e., that 204/$\theta(i)$ does fall between or is equal to $\theta_{lower\_limit}(i)$ and $\theta_{upper\_limit}(i)$, flow of the algorithm proceeds to block 416.

At block 416, in one embodiment, the computer processor determines whether the contact length 206/$l_c$ is less than a length of the link $l_i$. In equation form, the processor at operation 416 determines whether 206 (or $l_c$)<208 (or $l_i$). In one embodiment, the consideration of block 416 includes determining whether the contact occurred on link $l_i$.

It will be appreciated that this relationship will be met when the determined contact 504 would fall on the present link (i) (e.g., link 134).

The link length 208, or $l_i$, is shown schematically in FIG. 2 as extending between the joint at the beginning of the link (i), being joint 132 in the figure, and the joint at the end of the link (i), being joint 134 in the figure. The exact link length may not be exactly this distance—between the two joints as provided, but is, like the other dimensions indicated in the figures, shown schematically for efficiency of description.

Responsive to a positive determination at block 416—i.e., the contact length 206, or $l_c$, is less than the link (i) length 212, and so the determined contact 504, associated with the determined link (i) angle 204, or $\theta(i)$, would fall on the present link (i), flow of the algorithm proceeds to block 418. At block 418, the processor determines that the determined contact is a feasible, or valid grasp contact on the present, $i^{th}$, link.

The processor at block 418, accordingly, accepts, or sets, the determined angle 204, or $\theta(i)$ as the angle for the link (i). The value is set in connection with the present link (i) for use in any subsequent processing, such as in next iteration(s) of the process 400 in connection with any higher links (i+1, . . . , $N_e(k)$). The setting can include storing the value in short (e.g., cache) or long-term memory. The angle, set as such, can be referred to as a validated or accepted contact angle for the link (i). As provided above, the angle determined 204/$\theta(i)$ prior to the validation can be referred to as a proposed angle for the link (i), a potential angle for the link (i), or similar.

As a further part of determining that the contact is valid at operation 418, or feasible, and present on the present link (i), the computer processor at operation 418 sets the contact and contact length 206/$l_c$ as a valid contact and contact length in connection with the link (i). Again, the setting can include storing the value in short (e.g., cache) or long-term memory. And the value is set in connection with the present link (i) for use in any subsequent processing, such as in next iteration(s) of the process 400 in connection with any higher links (i+1, . . . , $N_e(k)$) and/or for use in determining or analyzing the final grasp planned using the value.

From block 418, flow of the algorithm proceeds to decision diamond 420 whereat the processor determines whether the present link (i) is the last link $N_e(k)$ on the finger (k).

Responsive to a negative determination at block 420—the present link (i) is not the last link on the finger (k)—i.e., (i)=$N_e(k)$, then flow proceeds to block 422. At block 422, the processor iterates to the next link, i.e., i+1, for re-performing the process 400 in connection with the next link (i+1), as indicated by return-flow path 425. In the re-performance of the process 400, the processor will consider the pose of the present link (i)—e.g., the determined angle (i), and the contact and contact length, as that set at block 418.

In one embodiment, the grasping-device data includes initial or default settings for any lateral, or yaw, joints, such as those described above. The settings for the lateral, or yaw, joints would remain in place until the processor determines that they should be changed. Such adjustment is described below in connection with block 411.

Responsive to a positive determination at block 420—i.e., the present link (i) is the last link on the finger (k)—i.e., (i)=$N_e(k)$, then flow proceeds to decision diamond 424. At decision 424, the processor determines whether a valid contact was set for all links (including the current link), coupled to the current link, in the current and previous iterations of the process 400, in connection with any of the previous links (i−1, . . . , $N_s(k)$) coupled to link (i)=$N_e(k)$.

If at decision 424 the computer processor determines that valid contacts were associated, in the current and in all previous iterations of the process 400 for the current finger (k), with all previous links (i−1, . . . , $N_s(k)$) coupled to link (i)=$N_e(k)$, flow of the algorithm proceeds to local-termination pentagon 426. At act 426, the processor determines that the process 400 is complete for the present finger (k). The algorithm then proceeds to re-perform the processor 400 for other fingers (e.g., k+1, etc.) and/or compute the final planned grasp, as described further below.

If at decision 424 the processor determines that a valid contact was not associated, in any previous iterations of the process 400, with any previous links (i−1, . . . , $N_s(k)$) coupled to link (i)=$N_e(k)$, flow of the algorithm proceeds to decision diamond 428.

At block 428, the computer processor determines whether the contact length 206, or $l_c$, is greater than half of link length 212, $l_i$; or whether $l_c$>0.5·$l_i$. It will be appreciated that the decision of diamond 428 determines whether the determined contact on the link $N_e(k)$ is on the top half of the link $N_e(k)$.

The 0.5 value is provided as an example embodiment in which, while a contact was not determined (cross reference act 424) for a previous link (i−1, . . . , $N_s(k)$), a contact at around or above about the midpoint of the last link $N_e(k)$ is considered valid and sufficient. The mid-area, indicated by reference numeral 213 in FIG. 2, of the last link $N_e(k)$ of the finger (k) corresponds generally to the middle of the fingerprint portion of a human finger, where better grasp can be accomplished as compare, e.g., to a lower portion of the link $N_e(k)$.

While the present example cites the half point, i.e., $0.5 \cdot l_i$, the algorithm can be configured to focus on other thresholds without departing from the scope of the present disclosure, depending on a portion of the last link that the contact is desired to be made on. For instance, if it is preferred that the contact be in the top seventy percent of the finger, then 0.3 would be used instead of the 0.5 in the example. In a contemplated embodiment, the consideration of diamond 428 also or instead includes a consideration of whether the location on the link of the contact is at or above a minimum threshold amount of the link—e.g., whether the contact is above at least 40%, or 50%, for example, of the link (i).

Following a positive result at decision diamond 428—e.g., the contact length 206, or is greater than half of the link length 212, or $l_i$; or $l_c > 0.5 \, l_i$ flow of the algorithm proceeds to local-terminal pentagon 426, which is described above.

Following a negative result at decision diamond 428—e.g., the contact length 206, or $l_c$, is not greater than half of the link length 212, or $l_i$; or $l_c$ is not $> 0.5 \cdot l_i$, flow of the algorithm proceeds to block 411, which is described above.

Returning to the decision of diamond 416, responsive to a negative determination there—i.e., the contact length 206, or $l_c$ is greater than the link (i) length 212, and so the determined contact 504, associated with the determined link (i) angle 204, or θ(i), would not fall on the present link (i), flow of the algorithm proceeds to block 430. At block 430, the computer processor determines that a valid, preferred, or feasible grasp contact does not exist on the present, $i^{th}$, link.

Because the contact was identified in connection with the determined angle 204/θ(i) being within the lower and upper limits (positive branch from block 406), the processor, despite the contact not being at the present link (i), accepts, or sets the determined angle 204/θ(i) as the angle for the link (i). The value is associated with the present link (i) for use in any subsequent processing, such as in next iteration(s) of the process 400 in connection with any higher links (i+1, . . . , $N_e(k)$). The rational for setting the determined angle as the angle for the present link (i) includes the contact being a valid, or feasible, or possibly valid contact for the finger (k), overall, though the contact is not at the present link (i).

The setting/associating can include storing the value in short (e.g., cache) or long-term memory. The angle, set as such, can be referred to as a validated or accepted contact angle for the link (i). The angle determined 204/θ(i) prior to the validation can be referred to as a proposed angle for the link (i), a potential angle for the link (i), or similar.

Because the contact determined is not at the present link—i.e., $l_c$ is not less than $l_i$, and so the contact is not a valid contact for the present iteration of the process 400, the computer processor does not at block 430 set the contact or contact length as being valid and associated with the present link (l). Rather, the contact and a different contact length (different by being referenced to a finger (k) upper link on which the contact falls), will be set in a following iteration of the process 400 in connection with the upper link of the finger (k) on which the contact fall.

III.C. Iterations Forward to Upper Links

As provided above, following block 430 or the negative branch of decision 420, and as indicated by return path 425, flow of the algorithm continues to, still with respect to the present finger (k), repeat the method 400 in connection with the next link (i+1) until all links have been processed through the method 400.

In the re-performance of the method 400, the computer processor will consider any pose set/associated with the previous links, e.g., present link (i), and the contacts and contact lengths.

In the example of FIG. 2, relevant input data for the upper links include the link lengths 218, 220, and variables include angles 222 and 224, and example contact points are shown at 506 and 508. Reference numerals 214 and 216 indicate lengths between an end of the respective link and respective points of contact 506, 508 with the object 202.

III.D. Potential Re-Iteration at Lower Link—Push Back

As provided above, following block 411, and as indicated by return path 423, flow of the algorithm continues to, still with respect to the present finger (k), repeat the process 400 in connection with one or more of the lower links ((i−1), . . . , $N_s(k)$).

In the re-performance of the process 400, the computer processor will consider any pose set/associated with links below the link(s) being reconsidered in the re-iteration, and contact(s) and contact length(s) associated with such lower link(s).

III.E. Determining Hand Pose

The final grasping hand pose (or posture or configuration) is determined, or planned, using collectively the respective poses determined in connection with each finger (k). Thus, the final grasping pose can be determined upon completion of the process 400, including any needed iterations (reference return flow path 425) and any needed re-performances of lower links (reference return flow path 423) with respect to each finger (k).

In one embodiment, the process 400 is completed, for each finger (k), upon flow of the algorithm for the finger (k) reaching local-termination pentagon 426. In another, the process 400 is considered completed upon flow of the algorithm reaching either of termination pentagons 426 and 413 for each finger (k).

Example conditions under which the algorithm can ends include the following: 1) The first truncation of the polygon slice results in no polygon (the object is too far from the finger); 2) If projected angle for $\theta(N_s(k)) < \theta_{lower\_limit}(N_s(k))$ (reference operations 410-413); 3) If contact on the final link occurred above the middle of the link i.e. $l_c > l_{final}/2$ (reference decision 428); and 4) If the final joint is coupled to a previous joint(s) and all of them have contacts; else, the algorithm will perform the described push-back sub-process. Another example condition includes a determination that contact would occur on a desired link instead of the final link, such as a special link. A link could be special, e.g., by having a touch sensor (or, a touch-sensor link), having a special surface such as by being magnetized or having extra-gripping properties (e.g., high-friction rubber), or other special surface considerations (or, a special-surface link), or having other such qualities making a contact at the link especially important or valuable to the gripping goal.

The processor generates a final-grasping-pose instruction indicating the final grasping pose.

As provided above, some grasping devices have less separately controllable, actuatable, degrees of freedom (DOF) than it does finger joints. For instance, in an example aforementioned, a five finger hand having three or more joints per finger can have twelve (12) DOF due to two or more adjacent joints being controllable or actuatable together.

In one embodiment, the final-grasping-pose instruction considers the DOF of the present hand, which DOF information is obtained as the grasping-device data (reference operation 302). The instruction can include, for instances, indication of how each DOF should be set instead of or in addition to indication of the target angles for each joint of the finger and/or angles or poses for each finger link.

In one embodiment, the final-grasping-pose instruction indicates said target joint angles and/or link angles for each joint/link of the hand and the final-grasping-pose instruction is interpreted, by the same or different processor providing the final-grasping-pose instruction, executing the same or different computer-executable code as that associated with providing the final-grasping pose instruction, to calculate the needed DOF settings for implementation by the grasping device to make the final grasping pose. The instruction in some embodiments also includes contact location information, indicating the locations on the hand and/or object where the two are planned to touch.

IV. Computing System—FIG. 6

Figure 6:
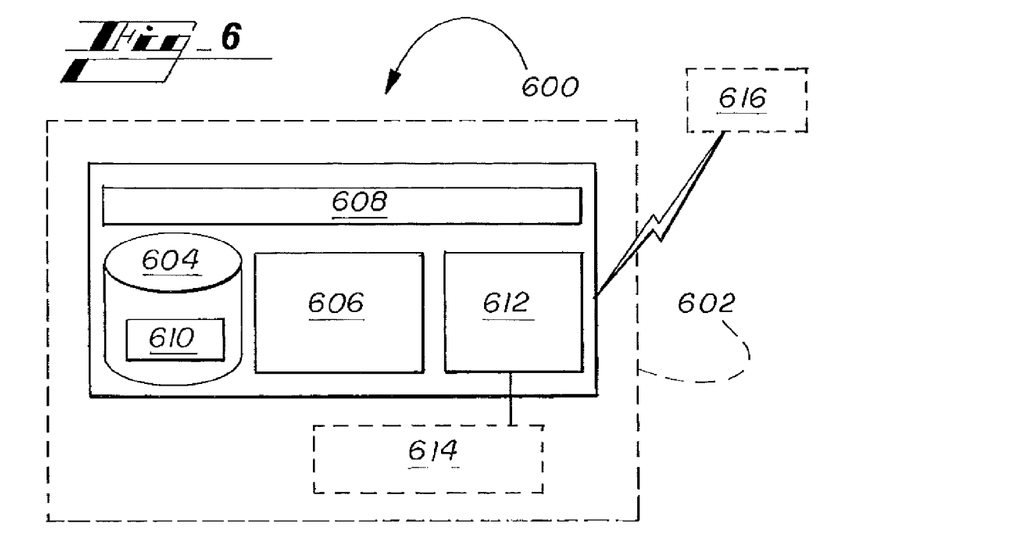
FIG. 6 illustrates an example computer system for use in performing the functions of the present technology.

FIG. 6 illustrates an example computer system 602 for use in performing the operations of the present technology. The system 602, or parts thereof, can be a stand-alone computer or a single board computer embedded and connected to a grasping device motion controller.

The system 602 includes a memory, or computer-readable medium 604, such as volatile medium, non-volatile medium, removable medium, and non-removable medium. The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The computing system 602 also includes a computer processor 606 connected or connectable to the computer-readable medium 604 by way of a communication link 608, such as a computer bus.

The computer-readable medium 604 includes computer-executable instructions 610. The computer-executable instructions 610 are executable by the computer processor 606 to cause the processor, and thus the computing system 602, to perform all or any combination of the functions described in the present disclosure, including those described above in connection with FIGS. 3 and 4.

The computer-executable instructions 610 can be arranged in one or more software modules. The modules can be referred to by the operations or operations that they cause the computer processor 606 to perform. For instance, a module including instructions that, when executed by the processor 606, cause the processor to perform an operation of transforming a planar polygon can be referred to as a transforming module, or planar-polygon transforming module, or the like.

Similarly, a module causing the computer processor to perform an operation to sweep finger links and compute grasp contact locations on finger links can be referred to as a sweeping module, sweep module, for instance, or the like.

The term software module, or variants thereof, is used expansively herein to include routines, program modules, programs, components, data structures, algorithms, and the like. Software modules can be implemented on various system configurations, including servers, network systems, single-processor or multiprocessor systems, minicomputers, mainframe computers, personal computers, hand-held computing devices, mobile devices, microprocessor-based, programmable consumer electronics, combinations thereof, and the like.

The computer processor 606 is also connected or connectable to at least one interface 612 for facilitating communications, between the computer system 602 and local components 614, and between the computing system 602 and the remote component 616. The system 602 and the remote component 606 can be considered together as an arrangement 600, as shown in FIG. 6. The components 614 can include databases, servers, other processors, other storage mediums, and/or other computing devices. The interface can include a transmitter, receiver, or transmitter that is wired and/or wireless-based for supporting wired and/or wireless protocol communications, respectively.

Although shown as being a part of the computer system 602, completely, the interface 612, or any aspect(s) thereof, is partially or completely a part of the system 602. The interface 612, or any aspect(s) thereof, can be partially or completely external to and connected or connectable to the computing system 602. For communicating with the remote components 616, the interface 612 includes one or both of a short-range transceiver and a long-range transceiver.

CONCLUSION

The technology described herein has benefits including facilitating grasping of a simple or complex object using a robotic grasping device, such as a robotic hand. Functions include planning a grasp, for implementation by the device, based on input data including object data, grasping-device data, and device approach data.

The planned grasp allows feasible and very fast and robust grasping as compared to conventional systems that grasp objects based simply on feedback from real-time vision systems and/or touch sensors. And conventional methods, such as attempting to grasp an object based only on feedback of one or more touch on-robot sensors, are computationally expensive and time consuming.

The present technology provides a fast and computation-saving solution for reliably grasping simple and complex objects. The advantages are accomplished in parts by decomposing the overall task of planning a grasp into at least two smaller tasks. In one embodiment, the breakdown includes a first-level decomposing, from all grasping-device members (e.g., fingers) to addressing them separately, albeit simultaneously or in parallel as described herein. The breakdown of the embodiment also includes a second-level decomposing, from an entirety of each finger to a link-by-link analysis.

Various embodiments of the present disclosure are disclosed herein. The disclosed embodiments are merely examples that may be embodied in various and alternative forms, and combinations thereof.

The law does not require and it is economically prohibitive to illustrate and teach every possible embodiment of the present claims. Hence, the above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

We claim:

1. A system, for use in planning a grasp for implementation by a grasping device having multiple grasping members, comprising:

a processor; and a computer-readable storage device having stored thereon computer-executable instructions that, when executed by the processor, cause the processor to perform operations comprising:

determining a member-curling plane for each of the multiple grasping members;

generating for each of the member-curling planes, a respective planar polygon representation of a three-dimensional object model, yielding multiple planar polygon representations;

transforming a first planar polygon representation, of the multiple planar polygon representations, corresponding to a first grasping member of the multiple grasping members, to a frame of a link, of multiple links, of the first grasping member, yielding a transformed planar polygon representation, wherein the transformed planar polygon representation is a cross-section of the three-dimensional object model taken along the member curling plane of the first grasping member; and sweeping the link from a fully-open position for the link to a point at which the link contacts the transformed planar polygon representation.

2. The system of claim 1, wherein the operations further comprise performing iterations, including at least the generating, transforming, and sweeping operations, with respect to each the multiple links of the subject member to determine a grasping pose for the links of the member.

3. The system of claim 1, wherein the operations further comprise:

determining, based on the sweeping operation, an angle ($\theta(i)$) for a subject link (i) of the plurality of links; and comparing the angle ($\theta(i)$) determined to a pre-set lower-limit angle ($\theta_{lower\_limit}(i)$) for the subject link (i) and a preset upper-limit angle ($\theta_{upper\_limit}(i)$), including determining whether the determined angle $\theta(i)$ is between the lower limit ($\theta_{lower\_limit}(i)$) and the ($\theta_{upper\_limit}(i)$).

4. The system of claim 3, wherein the operations further comprise determining, responsive to determining that the determined angle ($\theta(i)$) is not between the lower limit ($\theta_{lower\_limit}(i)$) and the upper limit ($\theta_{upper\_limit}(i)$), whether ($\theta(i)$) is greater than ($\theta_{upper\_limit}(i)$).

5. The system of claim 4, wherein the subject member is represented by (k), and the operations further comprise:

determining, if the determined angle ($\theta(i)$) is greater than the upper limit ($\theta_{upper\_limit}(i)$), that the subject member (k) would not, at the subject link (i), establish a valid grasp contact with the object model based on the determined link angle ($\theta(i)$); and setting as the link (i) angle, for use in subsequent grasp planning, in one or more next iterations, with respect to upper links (i+1, . . . , $N_e(k)$), the link (i) lower limit ($\theta_{lower\_limit}(i)$).

6. The system of claim 4, wherein:

the subject member is represented by (k); and the operations further comprise determining, if the angle ($\theta(i)$) is not greater than ($\theta_{upper\_limit}(i)$), whether the subject link (i) is a first link ($N_s(k)$) of the subject member (k).

7. The system of claim 6, wherein the operations further comprise:

determining, in response to determining that the subject link (i) is not the first link ($N_s(k)$) of the member (k), that an angle previously set for a prior link should be changed;

adjusting a previously-set angle ($\theta(i-1)$) of the immediately-preceding link (i-1), including lowering the previously-set angle ($\theta(i-1)$); and repeating, with respect to the subject link (i), after adjusting the previously-set angle ($\theta(i-1)$), and using the angle as adjusted for ($\theta(i-1)$), at least the generating, transforming, sweeping, and comparing operations.

8. The system of claim 6, wherein the operations further comprise:

determining, in response to determining that the subject link (i) is a first link of the subject member (k), that the subject member (k) would contact the object model at an angle that would not allow a proper grasp of the object model using the subject link, initiating obtaining of new approach data; and repeating, using the new approach data, at least the generating, transforming, sweeping, and comparing operations.

9. The system of claim 3, wherein the operations further comprise determining, in response to determining that the determined angle ($\theta(i)$) is between the lower limit ($\theta_{lower\_limit}(i)$) and the upper limit ($\theta_{upper\_limit}(i)$), whether contact with the object model occurred on the link.

10. The system of claim 9, wherein the operations further comprise:

determining, in response to determining that contact with the object model occurred on the subject link, that the contact determined is a valid grasp contact on the subject link; and setting the determined angle ($\theta(i)$) as the angle for the link (i), and setting the contact data as a valid contact, for use in one or more subsequent iterations including performing again at least the generating, transforming, sweeping, and comparing operations in connection with at least one higher link.

11. The system of claim 10, wherein the operations further comprise determining, responsive to determining that the determined contact is a valid grasp contact on the subject link, whether the subject link (i) is a last link ($N_e(k)$) on the member (k).

12. The system of claim 11, wherein the operations further comprise performing, responsive to determining that the subject link (i) is not the last link ($N_e(k)$) on the member (k), again at least the generating, transforming, sweeping, and comparing operations in connection with a next link (i+1), with the pose of the subject link (i) set as a consideration.

13. The system of claim 11, wherein the operations further comprise determining, in response to determining that the subject link (i) is the last link ($N_e(k)$) on the subject member (k), whether a valid contact was set for all links coupled to the current link.

14. The system of claim 13, wherein the operations further comprise determining, responsive to determining that a valid contact was set for all links, that processing is complete regarding the subject member (k).

15. The system of claim 14, wherein the operations further comprise initiating, responsive to determining that the processing is complete for the subject member (k), performance of processing with respect to at least one other members of the device.

16. The system of claim 13, wherein the operations further comprise determining, responsive to determining that a valid contact was not set for all links coupled to the subject link, in previous iterations, whether a contact length ($l_c$) is greater than half of a link length $l_l$.

17. The system of claim 5, wherein the operations further comprise determining, responsive to determining that the member would not, at the subject link, establish a valid grasp contact with the object model whether the subject link (i) is the last link ($N_e(k)$) on the subject member (k).

18. The system of claim 9, wherein the operations further comprise, responsive to determining that the determined angle ($\theta(i)$) is between the lower limit ($\theta_{lower\_limit}(i)$) and the upper limit ($\theta_{upper\_limit}(i)$):
   determining that a valid feasible grasp contact exists on the subject link; and
   setting the angle ($\theta(i)$) determined as a set angle for the link (i), for use in any subsequent processing, such as in any next iteration in connection with any higher links, with a pose set for the present link (i) as a consideration.

19. A method, for use in planning a grasp for implementation by a grasping device having multiple grasping members, comprising:
   determining, by a tangible system having a processor executing instructions stored on a non-transitory computer-readable storage device, a member-curling plane for each of the multiple grasping members;
   generating by the tangible system, for each of the member-curling planes, a respective planar polygon representation of a three-dimensional object model, yielding multiple planar polygon representations;
   transforming, by the tangible system, a first planar polygon representation, of the multiple planar polygon representations generated, corresponding to a first grasping member of the multiple grasping members, to a frame of a link, of multiple links of the first grasping member, yielding a transformed planar polygon representation, wherein the transformed planar polygon representation is a cross-section of the three-dimensional object model taken along the member-curling plane of the first grasping member; and
   sweeping, by the tangible system, the link from a fully-open position for the link to a point at which the link contacts the transformed planar polygon representation.

20. A non-transitory computer-readable storage device having stored thereon computer-executable instructions that, when executed by a processor, cause the processor to perform operations, for use in planning a grasp for implementation by a grasping device having multiple grasping members, comprising:
   determining a member-curling plane for each of the multiple grasping members;
   generating for each of the member-curling planes, a respective planar polygon representation of a three-dimensional object model, yielding multiple planar polygon representations;
   transforming a first planar polygon representation, of the multiple planar polygon representations generated, corresponding to a first grasping member of the multiple grasping members, to a frame of a link, of multiple links, of the first grasping member, yielding a transformed planar polygon representation, wherein the transformed planar polygon representation is a cross-section of the three-dimensional object model taken along the member-curling plane of the first grasping member; and
   sweeping the link from a fully-open position for the link to a point at which the link contacts the transformed planar polygon representation.

* * * * *